United States Patent [19]

Shiraki et al.

[11] Patent Number: 5,225,725
[45] Date of Patent: Jul. 6, 1993

[54] LINEAR DIRECT CURRENT MOTOR

[75] Inventors: Manabu Shiraki; Osami Miyao, both of Yamato; Masayuki Ohsaka, Sagamihara; Masayuki Fujiwara, Hadano; Daishi Yamaguchi, Sagamihara, all of Japan

[73] Assignees: Hitachi Metals, Ltd., Tokyo; Shicoh Engineering Co., Ltd., Kanagawa, both of Japan

[21] Appl. No.: 761,888

[22] Filed: Sep. 18, 1991

[30] Foreign Application Priority Data

Feb. 13, 1990 [JP] Japan ............... 21-2901[U]
Feb. 13, 1990 [JP] Japan ............... 21-2902[U]
Feb. 13, 1990 [JP] Japan ............... 21-2904[U]
Feb. 13, 1990 [JP] Japan ............... 21-2908[U]

[51] Int. Cl.$^5$ .......................... H02K 41/02
[52] U.S. Cl. ...................... 310/12; 310/68 B; 318/135
[58] Field of Search ............. 310/12, 173, 45, 68 B, 310/90; 318/135, 687

[56] References Cited

U.S. PATENT DOCUMENTS

| 3,858,308 | 1/1975 | Peterson | 29/598 |
| 4,935,080 | 6/1990 | Hassell et al. | 156/154 |
| 5,047,676 | 9/1991 | Ichikawa | 310/12 |

FOREIGN PATENT DOCUMENTS

| 0182469 | 10/1983 | Japan | 310/12 |
| 086471 | 5/1984 | Japan . | |
| 122359 | 7/1984 | Japan . | |
| 0031466 | 2/1988 | Japan | 310/12 |
| 035165 | 2/1988 | Japan . | |

*Primary Examiner*—Steven L. Stephan
*Assistant Examiner*—Judson H. Jones
*Attorney, Agent, or Firm*—Oliff & Berridge

[57] ABSTRACT

Disclosed herein is a linear d.c. motor comprising a field magnet composed of plural magnetic poles, and an armature formed by arranging armature coils along the moving direction of a moving element at a position facing the field magnet. One of the field magnet and armature is attached to the moving element, and the other is provided on a stator yoke serving as a stator. Projecting edges for linear guide, each of which projects outside and has a triangular form in cross section, are provided on both sides of the stator yoke, and guide rollers, each of which has an engaging groove in the form of a valley in its side part coming into slidable contact with the projecting edge for linear guide, are attached to the moving element. There is no possibility that the moving element is derailed because it is supported by the projecting edges of linear guide and the guide rollers. It is therefore possible to make the thrust of the moving element greater and cause it to travel at high speed.

3 Claims, 7 Drawing Sheets

1

LINEAR DIRECT CURRENT MOTOR

FIELD OF THE INVENTION

This invention relates to a polypolar polyphase type linear direct current motor, which permits guiding a moving element in a predetermined travelling direction without using any linear guide mechanism troublesome in particular and hence expensive, so that it can be fabricated at a lower cost. It is suitable for use in many fields such as linear tables and accurate measuring instruments.

BACKGROUND OF THE INVENTION

In polypolar polyphase type linear d.c. brushless motors, the polarity of each magnetic pole in a field magnet is discriminated by a pole-discriminating sensor to suitably change over the direction of an electric current fed to armature coils, thereby causing a moving element to travel linearly. The linear d.c. brushless motors capable of travelling linearly as described above have an advantage that the moving stroke of the moving element can be set up very long. However, such motors require a long linear guide mechanism for supporting the moving element so as to be movable linearly and reciprocally over the whole stroke. One of demerits of the linear d.c. motors when compared with rotating d.c. motors is that they must use a very expensive linear guide mechanism.

In general, a coreless type linear d.c. motor can use a relatively cheap linear guide mechanism because the magnetic attraction force [vertical force] between its moving element and stator is so small that it can be disregarded owing to its coreless structure, compared with a linear pulse motor and a core type linear d.c. motor.

Therefore, it has heretofore been attempted to fabricate a coreless and polypolar polyphase type linear d.c. motor LDM, as illustrated in FIGS. 19 through 21, by using a stator yoke 21, which can be incorporated at an extremely low cost, as a constituent element for linear guide without using any particular linear guide mechanism.

The conventional polypolar polyphase and moving-magnet type linear d.c. brushless motor LDM will be described with reference to FIGS. 19 through 21. The linear d.c. brushless motor LDM has such a structure that a group of air-core type armature coils 8 is disposed on the upper surface of the stator yoke 21 to compose a coreless stator armature 9, and a polypolar field magnet 10 formed by contiguously and alternately arranging magnetic poles, which have each an N or S polarity and a width of T as shown in FIG. 22, through a minute air gap over the coreless stator armature 9 is used as a moving element 24.

Incidentally, numeral 21 indicates a stator yoke-cum-linear guide, and numeral 11 designates a printed-wiring board arranged on the surface of the coreless stator armature 9, which faces the field magnet 10, and composed of a non-magnetic material. On the printed-wiring board 11, is formed a printed-wiring pattern (not shown) for electrically connecting terminals of pole-discriminating sensors 12 and the group of the armature coils 8. Numeral 22 indicates a traveling yoke. On both sides thereof, extended bent parts 22a extending downward are formed. Guide rollers 23 rotatably attached to the extended bent parts 22a are caused to guide along both sides of the stator yoke-cum-linear guide 21 to move them, whereby a moving element 24 composed of the traveling yoke 22 with the field magnet 10 attached thereto is linearly moved relative to a stator 25 composed of the coreless stator armature 9 and the like. Numeral 26 designates a stationary base for the stator 25.

Such a linear d.c. brushless motor LDM can save using an expensive linear guide because the stator yoke 21 itself, which is used to shut the magnetic path of a magnetic circuit, serves as a constituent element for linear guide mechanism, and hence has an advantage that it can be fabricated at a very low cost.

However, the linear d.c. brushless motor LDM involves a potential problem that when it is fabricated as a high-thrust motor or it is run at a high speed, the guide rollers 23 are derailed from the sides of the stator yoke 21 due to vibrations generating at that time. The linear d.c. brushless motor LDM making use of such a stator yoke 21 has also been accompanied by a demerit that since it has a structure that the moving element 24 tends to detach from the stator 25, its installing manner is limited, resulting in a motor having limited applications due to such a structure.

DISCLOSURE OF THE INVENTION

The present invention has been made in view of the foregoing circumstances. It is an object of this invention to obtain a linear d.c. motor, in which when a stator yoke is caused to serve as a constituent element for linear guide mechanism, a moving element can be prevented from easily detaching from a stator even by vibrations generating in the case where it is fabricated as a high-thrust motor or it is run at a high speed, and even at any installing position, thereby providing a linear d.c. motor which can be fabricated cheaply and easily without using any expensive linear guide mechanism as heretofore, has enlarged applications and is excellent in quality and performance.

In an aspect of the present invention, there is provided a linear direct current motor comprising a field magnet formed by P (P being an integer of 2 or higher) contiguous magnetic poles of alternating N and S polarity; an armature formed by n (n being an integer of 2 or higher) armature coils arranged along the moving direction of a moving element; a moving element relatively moving and provided with one of the field magnet and armature; and a stator yoke serving as a stator and provided with the other of the field magnet and armature, characterized in that projecting edges for linear guide, each of which projects outside and has a triangular form in cross section, are integrally formed on both sides of the stator yoke, and guide rollers, each of which has an engaging groove in the form of a valley in its side part coming into slidable contact with the projecting edge for linear guide, are attached to the moving element in a state that the guide rollers are caused to engage with the projecting edges for linear guide, respectively, thereby supporting the moving element linearly movably.

In another aspect of this invention, there is also provided a linear direct current motor wherein in the armature, pole-discriminating sensors are each arranged on a conductor portion of the armature coils, which contributes to the generation of thrust and faces the field magnet, and the thickness of the field magnet is made thin at a portion positioned on the traveling track along which the pole-discriminating sensors are relatively moved in order to prevent the pole-discriminating sensors relatively moving from coming into contact with the field magnet.

In a further aspect of this invention, there is provided a linear direct current motor wherein the field magnet comprises permanent magnets of N and S polarity, which are formed of rare-earth magnets coated with a magnet-failureproof and dust-generationproof film by an electrodeposition means, an epoxy resin paint or the like.

In a still further aspect of this invention, there is provided a linear direct current motor comprising a stator formed by disposing, on each surface of a stator base in the form of a long board, one of a coreless armature composed of n (n being an integer of 2 or higher) armature coils arranged along the moving direction of a moving element and a field magnet formed of P (P being an integer of 2 or higher) contiguous magnetic poles of alternating N and S polarity arranged along the moving direction of the moving element; a moving element formed by disposing the other of the field magnet and coreless stator armature on each internal surface of a member in a square 0-shape in vertical section viewed from the moving direction of the moving element facing the coreless armature or the field magnet of the stator; linear guide-forming rails respectively fixed to both sides of the stator base and each having a projecting edge for linear guide, which projects outside and has a triangular form in cross section; and guide roller each having an engaging groove in the form of a valley in its side part coming into slidable contact with the projecting edge for linear guide of the linear guide-forming rail, and rotatably attached to the member in the square 0-shape in vertical section of the moving element at both sides thereof, said guide rollers being engaged with the projecting edges for linear guide, respectively, whereby the moving element is linearly guided.

BEST MODE FOR CARRYING OUT THE INVENTION

First Embodiment of the Invention

Figure 1:
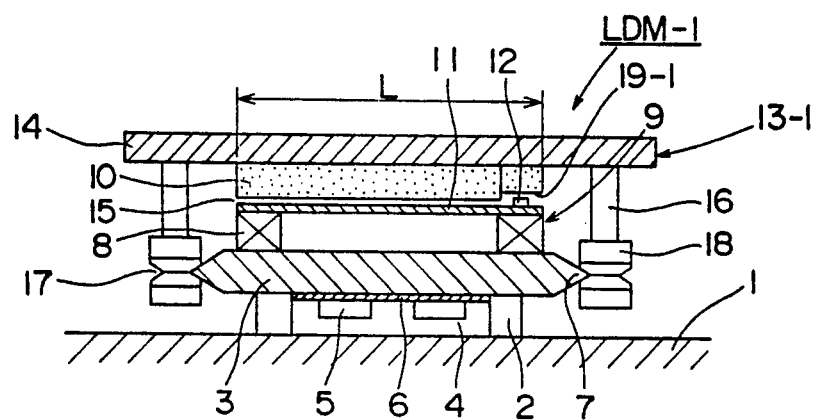
FIG. 1 is a vertical cross-sectional view of a polypolar polyphase moving-magnet type linear d.c. brushless motor, viewed from the traveling direction of its moving element, to illustrate the first embodiment of this invention.
Figure 2:
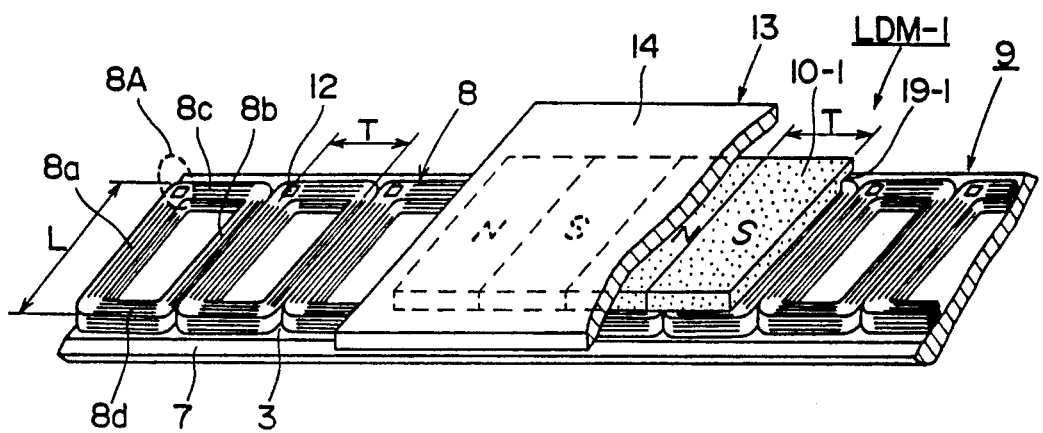
FIG. 2 is a top perspective view, partially omitted, of the polypolar polyphase moving-magnet type linear d.c. brushless motor.
Figure 3:
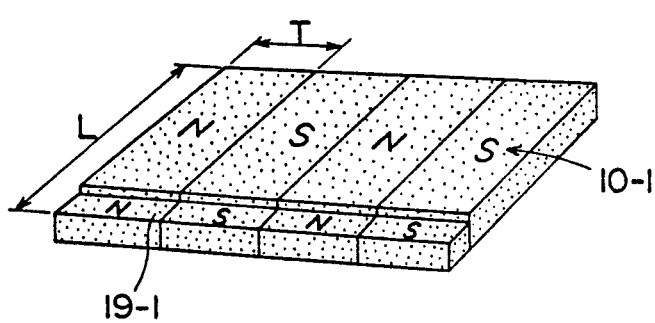
FIG. 3 is a bottom perspective view of a field magnet.
Figure 4:
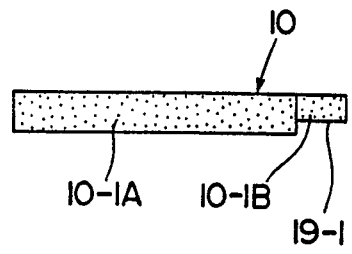
FIG. 4 is a vertical cross-sectional view, viewed from the traveling direction of a moving element, of the field magnet.

FIG. 1 is a vertical cross-sectional view of a polypolar polyphase moving-magnet type linear d.c. brushless motor LDM-1, viewed from the traveling direction of its moving element, to illustrate the first embodiment of this invention, FIG. 2 is a top perspective view, partially omitted, of the polypolar polyphase moving-magnet type linear d.c. brushless motor, FIG. 3 is a bottom perspective view of a field magnet 10-1, and FIG. 4 is a vertical cross-sectional view, viewed from the traveling direction of a moving element 13-1, of the field magnet.

Referring now to FIGS. 1 through 4, the moving-magnet type linear d.c. brushless motor LDM-1 includes a stator base 1 in the form of a long board, a stator yoke 3 composed of a magnetic material in the form of a long board and provided fixedly with studs 2 on the stator base 1, and an air-gap 4 for containing a control circuit therein, said air-gap 4 being defined between the lower surface of the stator yoke 3 and the stator base 1.

A printed-wiring board 6, on the lower surface of which an energizing and controlling circuit 5 is located, is provided on the lower surface of the stator yoke 3, and the energizing and controlling circuit 5 is contained in the air-gap 4.

On both sides of the stator yoke 3, are integrally formed projecting edges 7 for linear guide, each of which projects outside and has a triangular form in cross section. They construct a linear guide together with guide rollers 18, which will be described subsequently.

A group of air-core type armature coils 8 are contiguously arranged on the upper surface of the stator yoke 3 in a close contact with one another so as not to overlap, so that a coreless stator armature 9 is composed.

The armature coils 8 will hereinafter be described. Each of the armature coils 8 has been formed by reciprocally winding a wire so as to shape an air-core type rectangular frame. However, the armature coil 8 may be formed from sheet coils using a printing, plating means or etching means. Although a case where a number of the coreless armature coils 8 are contiguously arranged so as not to overlap with one another is illustrated in this embodiment, they are not always required to arrange in close contact with one another.

According to this group of the air-core type coreless armature coils 8, each of the coreless armature coils 8 is formed by winding a wire in such a manner that supposing the width in the traveling direction of a moving element 13-1 of one magnetic pole in a field magnet 10-1, which will be described subsequently, is T, an interval between available conductor portions 8a and 8b, which contribute to the generation of thrust, is equal to the width T of said one magnetic pole so that a linearly reciprocating 180 degree energizing system good in efficiency and performance can be used.

Incidentally, in the armature coil 8, conductor portions 8c and 8d parallel to the traveling direction of the moving element 13-1 are conductor portions which do not very contribute to the generation of thrust. The armature coil 8 is formed in such a manner that the distance between both outsides of the conductor portions 8c and 8d is L.

A printed-wiring board 11 [in FIG. 2, the printed-wiring board 11 being omitted] in the form of a long board is fixedly disposed by a suitable means (not shown) on the upper surface of the coreless stator armature 9 formed by arranging the group of many armature coils 8 on the stator yoke 3. A conductive pattern for printed wiring (not shown) is formed on the printed-wiring board 11. Through this pattern, an electric current is fed to the group of the armature coils 8 and pole-discriminating sensors 12, which will be described subsequently, and moreover, output signals are obtained.

As the pole-discriminating sensors 12, may be used appropriate magnetoelectric transducers such as Hall IC devices, Hall elements and magnetoresistive elements. In this embodiment, Hall elements are used.

Each of the pole-discriminating sensors 12 is arranged on the printed-wiring board 11, which faces the field magnet 10-1, at a position over an conductor portion 8A where the conductor portion 8a of the armature coil 8, which contributes to the generation of thrust, intersects with the conductor portion 8c formed perpendicularly to the conductor portion 8a so as to permit the detection of the magnetic pole of N or S polarity of the field magnet 10-1. On the basis of an output signal from the pole-discriminating sensor 12 according to the magnetic pole of N or S polarity of the field magnet 10-1, a driver in the energizing and controlling circuit 5 is operated, so that an electric current is fed to the group of the coreless armature coils 8 in an appropriate direction so as to generate thrust in a predetermined direction.

The field magnet 10-1 is fixedly attached to the lower surface of a traveling yoke 14 composed of a magnetic material in the moving element 13-1 using a suitable means such as an adhesive, and faces the coreless stator armature 9 through a minute air-gap 15 and the printed-wiring board 11 so as to move relative to the coreless stator armature 9.

As illustrated in FIG. 3, the field magnet 10-1 is of a 4-pole structure formed in the shape of a long board by alternately and contiguously arranging permanent magnets of N or S polarity, wherein the width in the traveling direction of the moving element 13-1 of one magnetic pole is T, and the distance between both sides of the magnetic pole parallel to the traveling direction of the moving element 13-1 is L.

Guide roller-supporting members 16 are fixed to the lower surface of the traveling yoke 1 at both sides thereof. A guide roller 18 having an engaging groove 17 in the form of a valley or V-shape in its side part, said groove being suitable for slidable contact with the projecting edge 7 for linear guide, is rotatably attached to the lower end of each guide roller-supporting member 16, so that the guide rollers 18 slidably engaged with the projecting edges 7 for linear guide, which have been formed on both sides of the stator yoke 3, are movably supported along the longitudinal direction of the stator yoke 3 to movably guide the moving element 13-1 in its longitudinal direction. Namely, a linear guide for linearly movably guiding the moving element 13-1 is composed by the guide rollers 18 and the projecting edges 7 for linear guide, which have been formed on both sides of the stator yoke 3.

Incidentally, since the conductor portions 8c, 8d in the coreless armature coil 8 do not generally contribute to the generation of thrust except for their corners as described above, a field magnet whose breadth (width between both sides) is shorter than the length of the armature coil 8 by the width of the conductor portions 8c and 8d may be used. However, conductor portions 8A of the corners where the conductor portions 8a and 8c, 8a and 8d, 8b and 8c as well as 8b and 8d cross with each other may also contribute to the generation of thrust though the extent is a little. It is therefore desirable to effectively utilize these conductor portions 8A so as to permit the generation of greater thrust.

For this reason, those having a breadth equal to the length L of the coreless armature coil 8 are used as the field magnet 10-1 in this invention so as to permit the generation of greater thrust even by a small extent.

Accordingly, unless some measures are taken, the group of the pole-discriminating sensors 12 will contact with the field magnet. In this embodiment, a concave groove 19-1 is defined like a step in the surface of the field magnet 10-1 at a portion facing the conductor portion 8c, which does not very contribute to the generation of thrust, along the longitudinal direction of the moving element 13-1, thereby making the thickness of the field magnet thin at that portion so as to prevent the pole-discriminating sensors 12 from coming into contact with the field magnet 10-1.

Incidentally, the portion of the field magnet 10-1, at which the concave groove 19-1 has been defined, does not generate very great thrust from the first. Therefore, it is desirable that with respect to the field magnet 10-1 in which the concave groove 19-1 is defined, a portion 10-1A of the field magnet, in which the concave groove 19-1 is not defined, should be formed using a rare-earth magnet such as a samarium.cobalt magnet, or a neodymium.iron.boron magnet, which generates strong magnetic flux, so as to permit the generation of greater thrust, and a portion 10-1B of the field magnet, in which the concave groove 19-1 is defined, should be formed using a cheap ferrite magnet or rubber magnet because its portion may be used only as a magnet for detecting the polarity of the pole-discriminating sensors 12, as illustrated in FIGS. 3 and 4. However, in this embodiment, since it is necessary that the field magnet portion 10-1B is caused to contribute to the generation of still greater thrust, the whole field magnet 10-1 is formed using a rare-earth magnet such as a samarium. cobalt magnet, or a neodymium.iron.boron magnet, which generates strong magnetic line of force, like the field magnet portion 10-1A.

In this embodiment, when a rare-earth magnet such as a samarium.cobalt magnet or a neodymium-iron-boron magnet is used as a field magnet 10-1, the dust of the magnet is generated due to breakage of the magnet because this field magnet 10-1 is very brittle. Besides, the field magnet making use of the neodymium. iron.boron magnet tends to corrode. In order to prevent the generation of dust or occurrence of corrosion of such a magnet, the magnet is coated with a coating film of the order of submicron by an electrodeposion-plating means such as ion plating. By the way, in order to achieve the same aim, another means may be used to coat the surface of the field magnet 10-1 with a protective film, thereby preventing the failure of the field magnet 10-1.

Second Embodiment of the Invention

Figure 5:
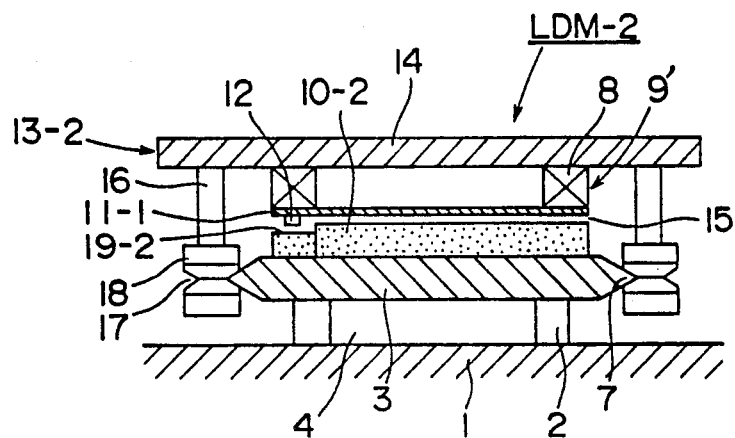
FIG. 5 is a vertical cross-sectional view of a polypolar polyphase moving-armature type linear d.c. brushless motor, viewed from the traveling direction of its moving element, to illustrate the second embodiment of this invention.
Figure 6:
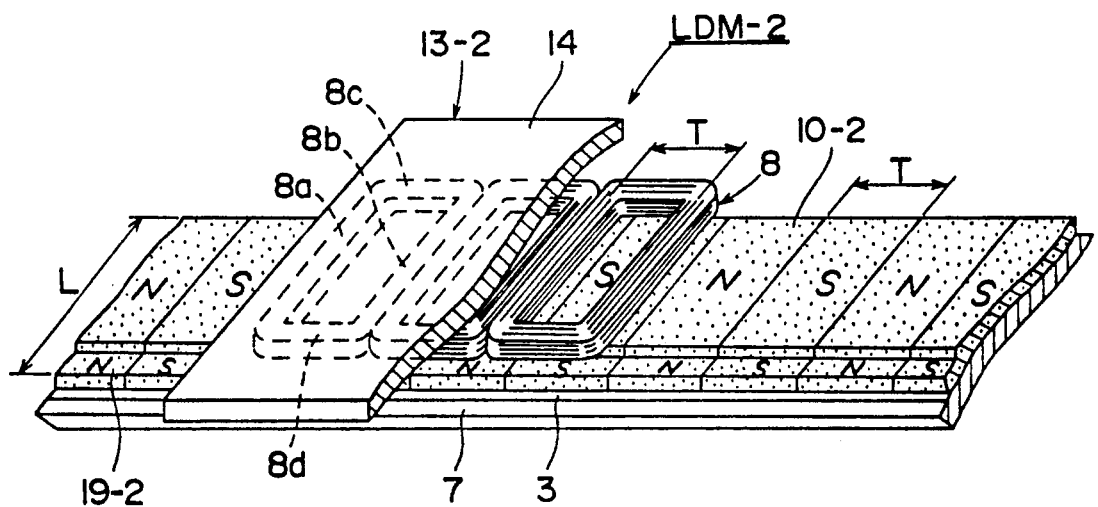
FIG. 6 is a top perspective view, partially omitted, of the polypolar polyphase moving-armature type linear d.c. brushless motor.
Figure 7:
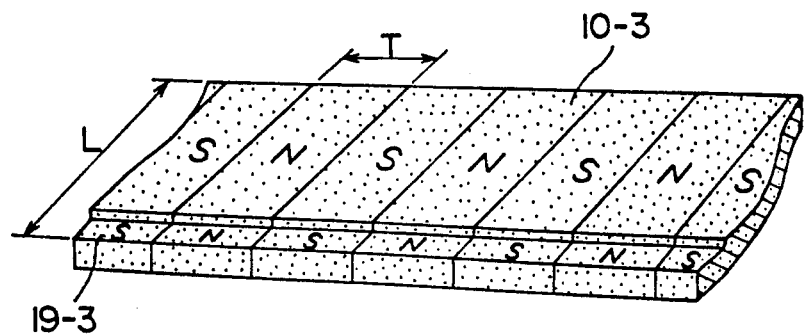
FIG. 7 is a top perspective view of a field magnet.

FIG. 5 is a vertical cross-sectional view of a moving-armature type linear d.c. brushless motor LDM-2, viewed from the traveling direction of its moving element 13-2, to illustrate the second embodiment of this invention, FIG. 6 is a top perspective view, partially omitted, of the moving-armature type linear d.c. brushless motor LDM-2, and FIG. 7 is a top perspective view of a field magnet 10-2

In this moving-armature type linear d.c. brushless motor LDM-2, a field magnet 10-2 similar to the above-described field magnet 10-1 is used. On the side of a stator yoke 3, is fixedly provided a field magnet 10-2 of a polypolar structure, which has been formed by alternately arranging permanent magnets of N or S polarity long over the entire length of the moving stroke of a moving element 13-2. A moving coreless armature 9' is formed by contiguously arranging a plurality of the above-described armature coils 8 on the lower surface of the traveling yoke 14. A printed-wiring board 11-1 is disposed on the lower surface of the moving armature 9'. In the same manner as described above, each of pole-discriminating sensors 12 is arranged on the printed-wiring board 11-1 at a position facing the conductor portion 8A of the armature coil 8. Similar to the field magnet 10-1 illustrated in FIG. 3, a concave groove 19-3 is defined in the field magnet 10-2 at a portion facing the pole-discriminating sensors 12 along its longitudinal direction, thereby making the thickness of the field magnet thin at that portion so as to prevent the field magnet 10-2 from coming into contact with the pole-discriminating sensors 12.

Accordingly, when a control signal to the effect that the moving element 13-1 or 13-2 is caused to move at a predetermined speed and displacement is input in the energizing and controlling circuit 5 by a signal from the microcomputer (not illustrated) in the above-described linear d.c. brushless motor LDM-1 or LDM-2, and the pole-discriminating sensor 12 provided on the side of the armature 9-1 or 9-2 detects the magnetic pole of N or S polarity of the field magnet 10-1 or 10-2 at the portion of its concave groove 19-1 or 19-2, an electric current in a predetermined direction is caused to flow into the group of the coreless armature coils 8 through the driver according to the detected output signal. As a result, thrust coinciding with the Fleming's left-hand rule is generated in a predetermined direction by the group of the coreless armature coils 8 and the field magnet 10-1 or 10-2 facing it, so that the moving element 13-1 or 13-2 can be servocontrolled to cause it to travel under control of a feedback loop. The moving element 13-1 or 13-2 is thus caused to travel smoothly linearly while its guide rollers 18 are brought into slidable contact with the projecting edges 7 for linear guide.

According to the above-described constitution, the stator yoke constructs a linear guide mechanism and moreover, the contact area between the projecting edges for linear guide, which have been formed on the stator yoke, and the guide rollers is wide, so that vibrations become less. In addition, such a linear guide mechanism has a structure that the guide rollers are not detached from the projecting edges for linear guide. Therefore, the guide rollers can be prevented from detaching from the projecting edges for linear guide due to great vibrations generating in the case where the linear d.c motor is fabricated as a high-thrust motor or it is run at a high speed, whereby the moving element is not derailed. The linear d.c. motors can hence be installed at various positions for various applications. Furthermore, the stator yokes which can exhibit such an effect and also use as a linear guide is very cheap, and can be assembled with extreme ease, so that the present invention has a practical effect that linear d.c. motors excellent in quality and performance can be provided at low cost.

In addition, if the pole-discriminating sensors are arranged at positions facing the conductor portions of the armature coils, which contribute to the generation of thrust, the field magnet does not come into contact with the pole-discriminating sensors and the distance of the field air gap can be shortened because the portion of the field magnet, which faces the pole-discriminating sensors, is formed thin so as not to come into contact with the pole-discriminating sensors. Besides, since the whole armature coil can be caused to face the field magnet, the conductor portions of the armature coil, which have been useless to date, can be caused to contribute to the generation of thrust. The present invention hence has an advantage that linear d.c. brushless motors better in efficiency and capable of generating greater thrust can be fabricated with ease without bringing upon sharp increase in cost.

Third Embodiment of the Invention

Figure 8:
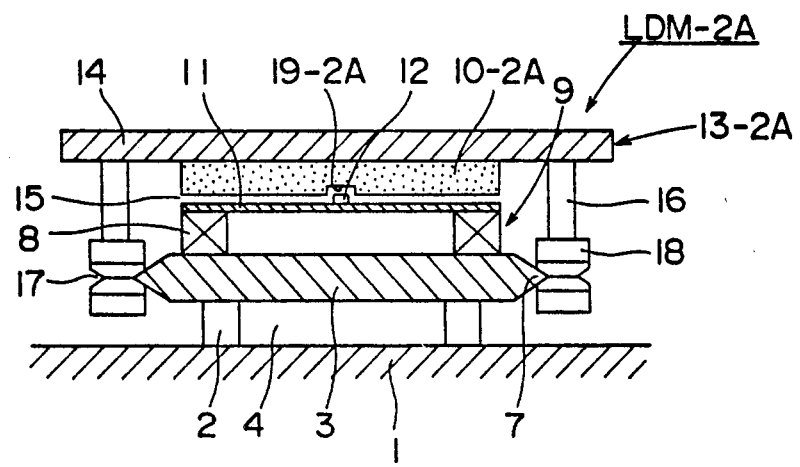
FIG. 8 is a vertical cross-sectional view of a polypolar polyphase moving-magnet type linear d.c. brushless motor, viewed from the traveling direction of its moving element, to illustrate the third embodiment of this invention.
Figure 9:
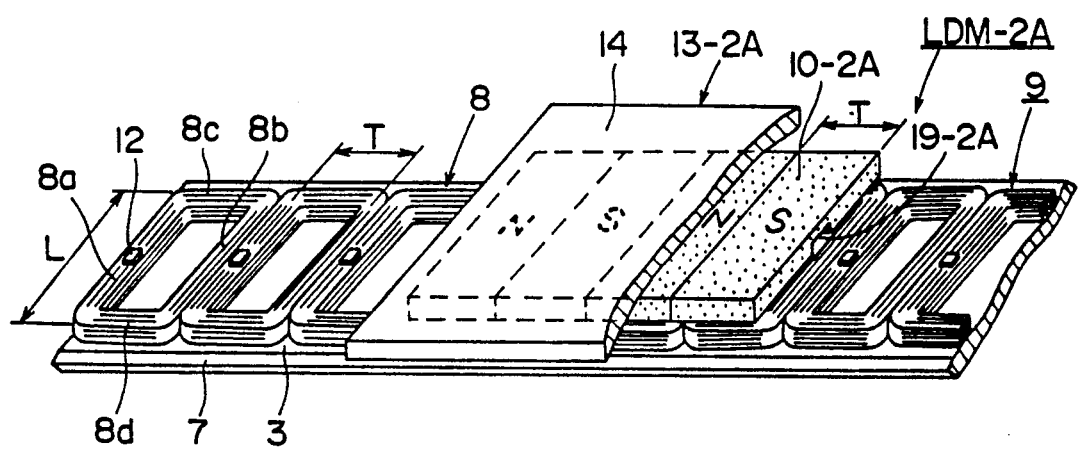
FIG. 9 is a top perspective view, partially omitted, of the polypolar polyphase moving-magnet type linear d.c. brushless motor.
Figure 10:
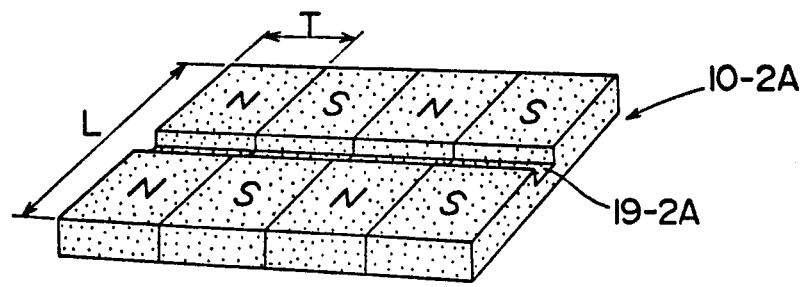
FIG. 10 is a bottom perspective view of a field magnet.

FIG. 8 is a vertical cross-sectional view of a moving-magnet type linear d.c. brushless motor LDM-2A, viewed from the traveling direction of its moving element, to illustrate the third embodiment of this invention, FIG. 9 is a top perspective view, partially omitted, of the moving-magnet type linear d.c. brushless motor LDM-2A, and FIG. 10 is a bottom perspective view of a field magnet 10-2A.

Incidentally, the description as to the parts common to those in the first embodiment is omitted in order to avoid repeated description. The third embodiment will hereinafter be described with reference to FIGS. 8 through 10. In this moving-magnet type linear d.c. brushless motor LDM-2A, each of pole-discriminating sensors 12 is arranged on a printed-wiring board 11 [not illustrated in FIG. 9] at a position over the center of an conductor portion 8a of an armature coil 8, which contributes to the generation of thrust, so as to permit the detection of the magnetic pole of N or S polarity of the field magnet 10-2A.

The field magnet 10-2A has the same conditions as the field magnet 10-1 except that only a concave groove 19-2A, which will be described subsequently, is different.

In this embodiment, in order to prevent the group of the pole-discriminating sensors 12 from coming into contact with the field magnet 10-2A like the case of the above-described first embodiment, a concave groove 19-2A is defined in the central portion of the field magnet 10-2A, which relatively faces the pole-discriminating sensors 12, along its longitudinal direction so that the thickness of such a portion may become thin. By the way, character 13-2A designates a moving element.

Fourth Embodiment of the Invention

Figure 11:
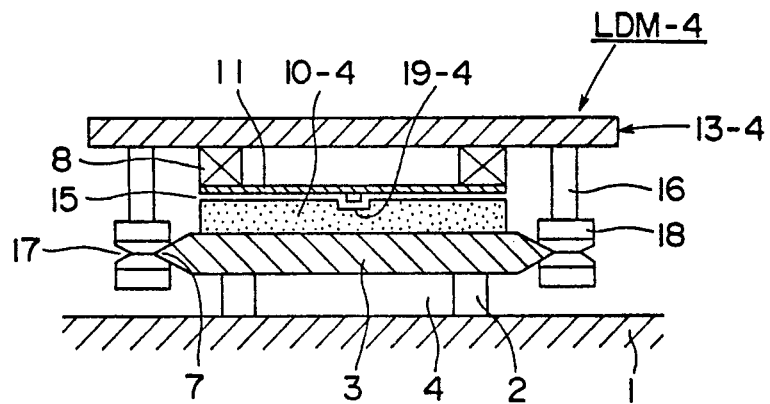
FIG. 11 is a vertical cross-sectional view of a polypolar polyphase moving-armature type linear d.c. brushless motor, viewed from the traveling direction of its moving element, to illustrate the fourth embodiment of this invention.
Figure 12:
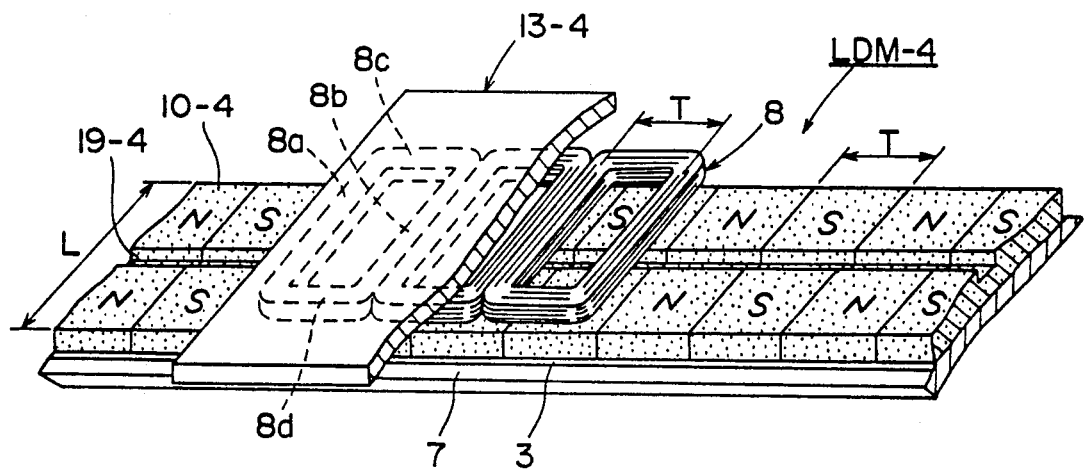
FIG. 12 is a top perspective view, partially omitted, of the polypolar polyphase moving-armature type linear d.c. brushless motor.
Figure 13:
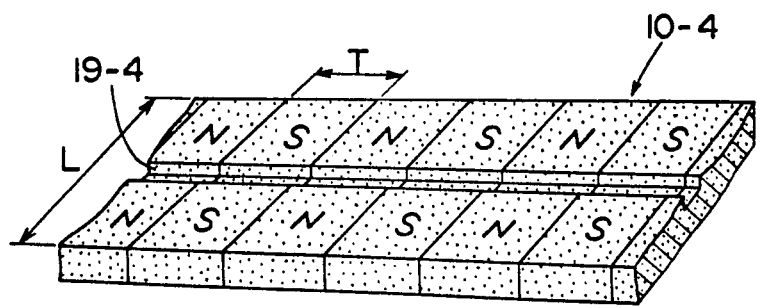
FIG. 13 is a top perspective view of a field magnet.

FIG. 11 is a vertical cross-sectional view of a moving-armature type linear d.c. brushless motor LDM-4, viewed from the traveling direction of its moving element 13-4, to illustrate the fourth embodiment of this invention, FIG. 12 is a top perspective view, partially omitted, of the moving-armature type linear d.c. brushless motor LDM-4, and FIG. 13 is a top perspective view of a field magnet 10-4.

The fourth embodiment will hereinafter be described with reference to FIGS. 11 through 13. This moving-armature type linear d.c. brushless motor LDM-4 has substantially the same structure as that of the above-described moving-armature type linear d.c. brushless motor LDM-2 and is different therefrom in an arranging position of pole-discriminating sensors 12 and a defining position of a concave groove 19-4. Each of the pole-discriminating sensors 12 is arranged on a printed-wiring board 11 [not illustrated in FIG. 12] at a position under the center of an conductor portion 8a of an armature coil 8, which contributes to the generation of thrust, so as to permit the detection of the magnetic pole of N or S polarity of the field magnet 10-4. In this embodiment, in order to prevent the group of the pole-discriminating sensors 12 from coming into contact with the field magnet 10-4 like the case of the above-described second embodiment, a concave groove 19-4 is defined in the portion of the field magnet 10-4, which relatively faces the pole-discriminating sensors 12, along its longitudinal direction so that the thickness of such a portion may become thin.

In both linear d.c. brushless motors LDM-2A and LDM-4, each moving element is also caused to travel linearly while its guide rollers 18 are brought into slidable contact with the projecting edges 7 for linear guide.

Fifth Embodiment of the Invention

Figure 14:
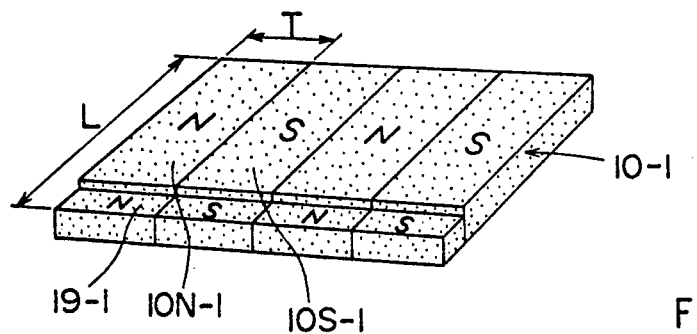
FIG. 14 is a bottom perspective view of a field magnet according to the fifth embodiment of this invention.

In the fifth embodiment of this invention, a field magnet 10-1 is of a 4-pole structure formed in the shape of a long board by alternately arranging permanent magnets 10N-1 of N polarity and permanent magnets 10S-1 of S polarity, which are each formed by a rare-earth magnet composing a magnetic pole such as a samarium.cobalt magnet, as illustrated in FIG. 14.

When the permanent magnets 10N-1, 10S-1 each formed by a rare-earth magnet such as a samarium.cobalt magnet or a neodymium-iron-boron magnet are used as a field magnet 10-1 in order to generate strong magnetic flux for the purpose of obtaining greater thrust, surfaces of these permanent magnets 10N-1, 10S-1 are broken due to vibrations and/or deterioration with age because of their extreme brittleness, so that the dust of the magnets is generated to adhere to the surfaces of the magnets. Therefore, the dust is interposed between the stator and the moving element to break them, and adversely affects slidability and thrust behavior. Furthermore, it deteriorates the properties of the permanent magnets 10N-1, 10S-1 and moreover, brings upon their great breakage.

Figure 15:
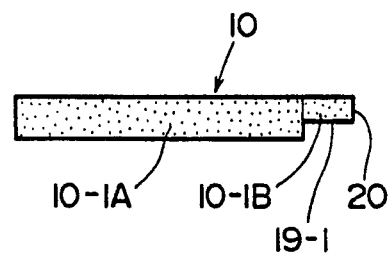
FIG. 15 is a vertical cross-sectional view, viewed from the traveling direction of a moving element, of the field magnet.

In order to prevent such a problem, as illustrated in FIG. 15, the surfaces of the permanent magnets 10N-1, 10S-1 are coated with a magnet-failureproof and dust-generationproof film of the order of micron or submicron by an electrodeposion-plating means such as ion plating or a coating means with an epoxy resin or the like, thereby preventing the dust caused by the magnet breakage from generating on the surfaces of the permanent magnets 10N-1, 10S-1.

According to the above-described constitution, no dust caused by the magnet breakage generates even when the field magnet comes into contact with air, or is deteriorated with age. It is therefore surely possible to provide a linear d.c. brushless motor capable of generating reliable and great thrust, and long in life without deteriorating the properties of its field magnet and breaking both moving element and stator due to their contact with each other through the dust caused by the magnet breakage. By the way, the magnet-failureproof and dust-generationproof film is extremely thin in thickness. Accordingly, it goes without saying that even when such a film is coated on the field magnet, the deterioration of thrust is substantially negligible.

The provision of the magnet-failureproof and dust-generationproof film as described above can be applied to any field magnets according to other embodiments of this invention.

Sixth Embodiment of the Invention

Figure 16:
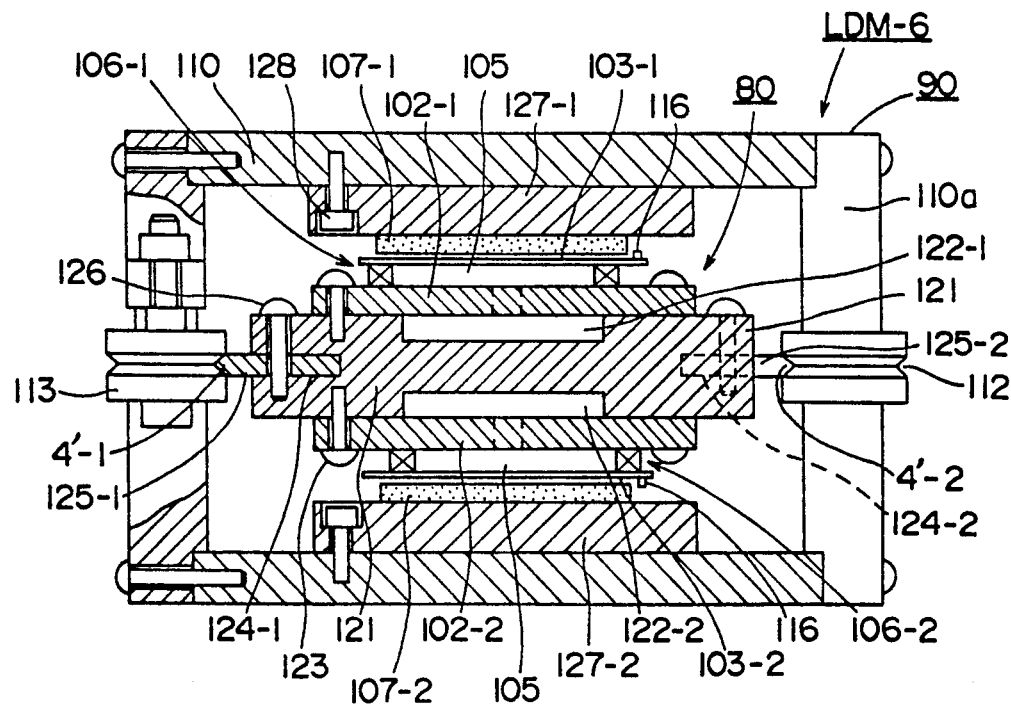
FIG. 16 is a vertical cross-sectional view of a polypolar polyphase, double-sided excitation moving-magnet type linear d.c. brushless motor, viewed from the traveling direction of its moving element, to illustrate the sixth embodiment of this invention.

FIG. 16 is a vertical cross-sectional view of a polypolar polyphase, double-sided excitation moving-magnet type linear d.c. brushless motor LDM-6, viewed from the traveling direction of its moving element, to illustrate the sixth embodiment of this invention.

Referring now to FIG. 16, the double-sided excitation moving-magnet type linear d.c. brushless motor LDM-6 includes concave portions 122-1, 122-2 for respectively containing energizing and controlling circuits therein, which have been formed on both upper and lower surfaces of a stator base 121 composed of a magnetic material in the form of a long board [in this embodiment, a magnetic material is used though the stator base may be formed by a non-magnetic material]. Openings of the concave portions 122-1, 122-2 are respectively covered with stator yokes 102-1, 102-1 composed of a magnetic material in the form of a long board using screws 123. On both outer surfaces of the stator yokes 102-1, 102-2, coreless stator armatures 106-1, 106-2, which have been formed by arranging each group of armature coils 105 on printed-wiring boards 103-1, 103-2 in the form of a long board, are fixedly disposed, respectively, by a suitable means such as screwing or an adhesive with the printed-wiring boards 103-1, 103-2 being faced with respective field magnets 107-1, 107-2, thereby forming a stator 80. Incidentally, the stator yokes 102-1, 102-2 may be justifiable in omitting them if the concave portions 122-1, 122-1 should not be provided, because the magnetic material is used as the stator base 121. However, in view of the use of a stator base 121 made of a non-magnetic material in a way of thinking, the motor according to this embodiment has been designed in advance so as to permit the provision of the stator yokes 102-1, 102-2.

Incidentally, a plate made of a non-magnetic material may be used for the purpose of electrically insulating instead of using the stator yokes 102-1, 102-2.

Long grooves 124-1, 124-2 are defined in both sides of the stator base 121 along its longitudinal direction. In the long grooves 124-1, 124-2, are fixed by screws 126 respective linear guide-forming rails 125-1, 125-2 having respective projecting edges 4'-1, 4'-2 for linear guide, which project outside and have a triangular form in cross section. A linear guide for causing a moving element 90 to travel linearly is constructed by the linear guide-forming rails 125-1, 125-2 and guide rollers 113.

In the linear d.c. brushless motor LDM-6 in this embodiment, a contact-feed mechanism is not used, but the change-over of an electric current fed to the group of armature coils 5 is carried out on the basis of signals from pole-discriminating sensors 116. Therefore, the pole-discriminating sensors 116 are arranged on the printed-wiring boards 103-1, 103-2 at positions over and under available conductor portions of armature coils 105, which contributes to the generation of thrust, or at positions extended therefrom so as to permit the detection of the magnetic pole of N or S polarity of the field magnets 107-1, 107-2. On the basis of output signals from the pole-discriminating sensors 116 according to the magnetic pole of N or S polarity of the field magnets 107-1, 107-2, a driver in the energizing and controlling circuit (not illustrated) is actuated, so that an electric current is fed to the groups of the coreless armature coils 105 in appropriate directions so as to generate thrust in a predetermined direction.

By the way, the pole-discriminating sensors 116 may be arranged on the printed-wiring board 103-1 or 103-2 on the side of either coreless stator armature 106-1 or 106-2 if the coreless stator armatures 106-1 and 106-2 are located at in-phase positions to each other. However, when the groups of the armature coils 105 of the coreless stator armatures 106-1 and 106-2 ar arranged with their phases shifted from each other in order to make the thrust ripple of the linear d.c. brushless motor LDM-6 smooth, the pole-discriminating sensors 116 must be located on the printed-wiring boards 103-1 and 103-2 on both sides of the coreless stator armatures 106-1 and 106-2. In this embodiment, a case where the pole-discriminating sensors 116 are arranged on the printed-wiring boards 103-1 and 103-2 on both sides of the coreless stator armatures 106-1 and 106-2 is described in view of the latter.

Figure 17:
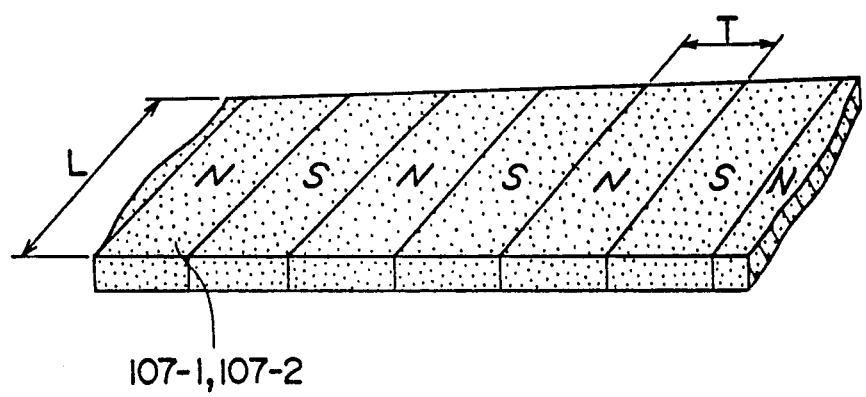
FIG. 17 is an explanatory illustration of a field magnet.

Traveling yokes 127-1, 127-2 in the form of a long board are fixed by screws 128 to inner surfaces of a traveling member 110 in the form of a rectangle in vertical section, said surfaces respectively facing the coreless stator armatures 106-1, 106-2 through an air-gap. Field magnets 107-1, 107-2 in the form of a long board, which have been formed in a poly-pole structure as illustrated in FIG. 17, are fixedly provided by a suitable means on the inner surfaces of the traveling yoke 127-1, 127-2, respectively, thereby forming a moving element 90 moving relatively to the coreless stator armatures 106-1, 106-2.

The traveling member 110 constructing the moving element 90 rotatably supports guide rollers 113 on its side walls 110a. The projecting edges 4'-1, 4'-2 for linear guide formed on the linear guide-forming rails 125-1, 125-2 are engaged with respective engaging grooves 112 in the form of a valley in the guide rollers 113 thus rotatably attached, thereby supporting the guide rollers 113 movably along the longitudinal direction of the linear guide-forming rails 125-1, 125-2 so as to guide the moving element 90 movably in the longitudinal direction.

Namely, the linear guide for causing the moving element 90 to travel linearly is constructed by the guide rollers 113 and the linear guide-forming rails 125-1, 125-2 having the projecting edges 4'-1, 4'-2 for linear guide.

Seventh Embodiment of the Invention

Figure 18:
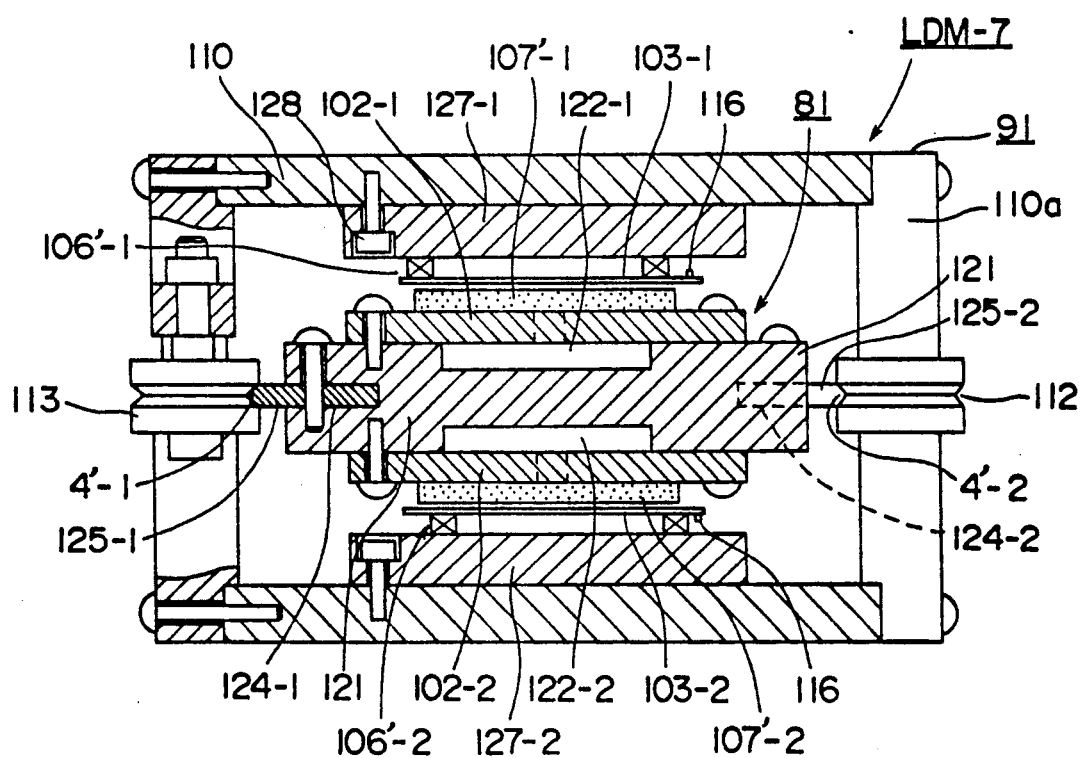
FIG. 18 is a vertical cross-sectional view of a polypolar polyphase, double-sided excitation moving-armature type linear d.c. brushless motor, viewed from the traveling direction of its moving element, to illustrate the seventh embodiment of this invention.
Figure 19:
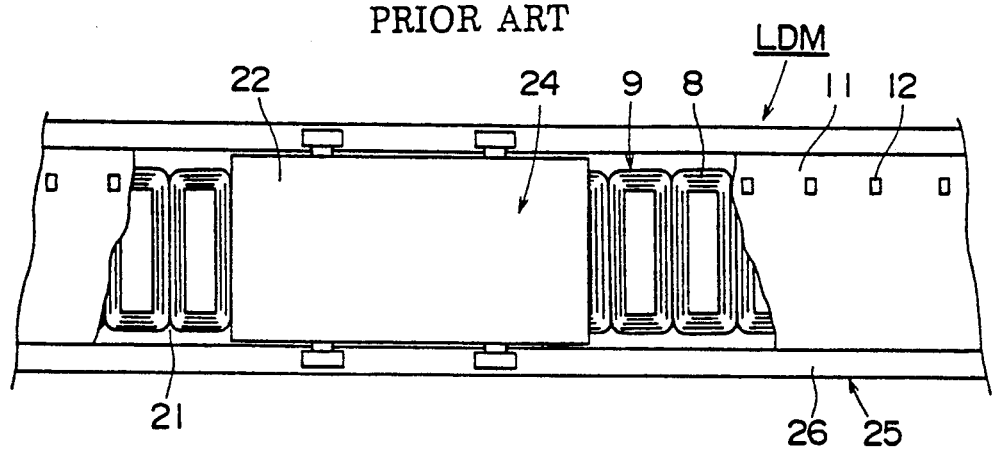
FIG. 19 a plan view of a conventional polypolar polyphase moving-magnet type linear d.c. brushless motor.
Figure 20:
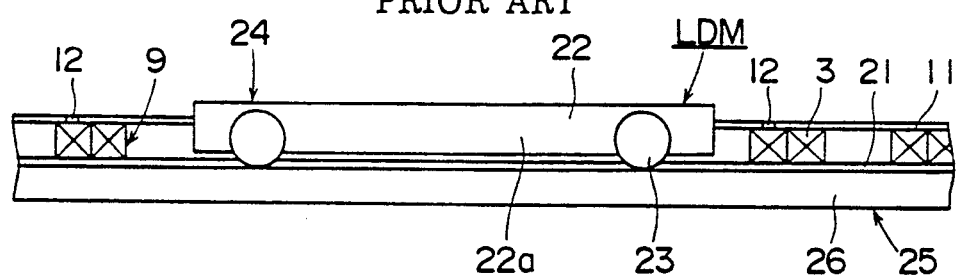
FIG. 20 is a side elevational view of the conventional polypolar polyphase moving-magnet type linear d.c. brushless motor.
Figure 21:
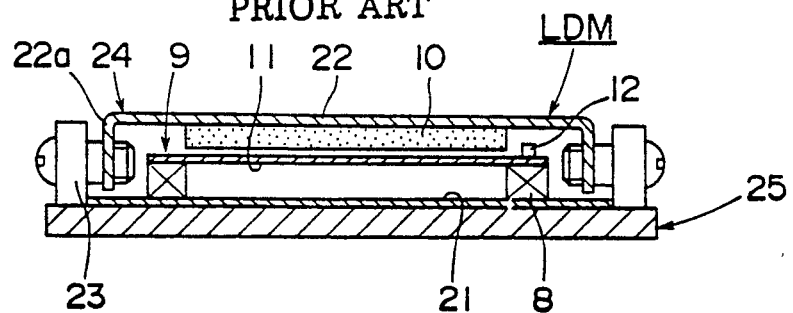
FIG. 21 is a vertical cross-sectional view, viewed from the traveling direction of its moving element, of the conventional polypolar polyphase moving-magnet type linear d.c. brushless motor.
Figure 22:
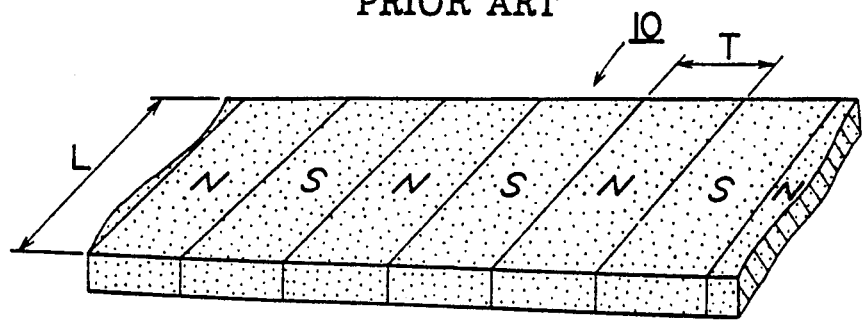
FIG. 22 is a bottom perspective view of a field magnet.

FIG. 18 is a vertical cross-sectional view of a moving-armature type linear d.c. brushless motor LDM-7, viewed from the traveling direction of its moving element 91, to illustrate the seventh embodiment of this invention. The structure of this linear d.c. brushless motor LDM-7 is substantially the same as that of the linear d.c. brushless motor LDM-6 described in the sixth embodiment. On the side of the traveling yokes 127-1, 127-2, are arranged moving-coreless armatures 106'-1, 106'-2 having the same structure as that of the coreless stator armatures 106-1, 106-2, but having less armature coils 105 and being shorter than such stator armatures. On the side of the stator yokes 102-1, 102-2 on the other hand, field magnets 107'-1, 107'-2 having substantially the same structure as that of the field magnets 107-1, 107-2 as illustrated in FIG. 17, but made longer by arranging a greater number of poles are disposed, thereby forming a stator 81.

When a control signal to the effect that the moving element 90 or 91 is caused to move at a predetermined speed and displacement is input in the energizing and controlling circuit by a signal from the microcomputer (not illustrated) in the above-described linear d.c. brushless motor LDM-6 or LDM-7, and the pole-discriminating sensor 116 provided on the side of the coreless stator armatures 106-1, 106-2 or the moving-coreless armatures 106'-1, 106'-2 detects the magnetic pole of N or S polarity of the field magnets 107-1, 107-2 or 107'-1, 107'-2, an electric current in a predetermined direction is caused to flow into the groups of the armature coils 105 through the driver according to the detected output signals. As a result, thrust coinciding with the Fleming's left-hand rule is generated in a predetermined direction by the groups of the coreless armature coils 105 and the field magnets 107-1, 107-2 or 107'-1, 107'-2 facing them, so that the moving element 90 or 91 can be servocontrolled to cause it to travel under control of a feedback loop. The moving element 90 or 91 is thus caused to travel smoothly linearly while its guide rollers 113 are brought into slidable contact with the projecting edges 4'-1, 4'-2 for linear guide.

According to the above-described constitution, the following effects can be achieved. Since the linear guide-forming rails, which can be expected to exhibit the same effect as a stator base for constructing a linear guide mechanism wide and expensive, are used, a linear guide mechanism capable of preventing the moving element from easily detaching from a stator even by vibrations generating in the above-described linear d.c. motor and even at any installing position, thereby enlarging its end applications can be fabricated easily and cheaply without using such an expensive stator base. Beside, since a heavy stator base for forming the linear guide mechanism may be not used, a light stator base can be chosen suitably, thereby providing a light double-sided excitation type linear d.c. motor.

Although the structures for linear d.c. brushless motor have been described in the above embodiments, the present invention is not necessary to limit thereto. It goes without saying that this invention may be applied to linear d.c. motors making use of a contact-feed mechanism such as brush and commutator.

INDUSTRIAL APPLICABILITY

The linear d.c motors according to this invention are suitable for use in many fields such as linear tables and accurate measuring instruments.

We claim:

1. A linear direct current motor comprising:
   a field magnet formed by P (P being an integer of 2 or higher) contiguous magnetic poles of alternating N and S polarity;
   an armature formed by n (n being an integer of 2 or higher) armature coils arranged for movement relative to the field magnet in a moving direction, wherein each of said armature coils comprise a conductor portion to increase the amount of thrust generated by the motor;
   a moving element moving in the moving direction and provided with one of the field magnet and armature;
   a stator yoke serving as a stator and provided with the other of the field magnet and armature;
   a linear guide formed in the stator yoke and having projecting edges integrally formed on both sides of the stator yoke, each projecting edge projecting and having a triangular form in cross section;
   guide rollers, each of which has an engaging groove in the form of a valley in its side part for slidably contacting the projecting edge of the linear guide, the guide rollers being attached to the moving element so that the guide rollers engage with the projecting edges of the linear guide thereby supporting the moving element for linear movement, wherein the field magnet comprises permanent magnets of N and S polarity, which are formed of neodymium-iron-boron magnets coated with a magnet-failure proof and dust-generation proof film;
   a plurality of pole discriminating sensors provided on said armature to sense a magnetic pole of said field magnet, wherein each of said plurality of pole discriminating sensors is located on said conductor portion of each of said armature coils; and
   a groove provided in said permanent magnets to accommodate said plurality of pole discriminating sensors to prevent said sensors from contacting said magnet and to reduce a field gap in said motor.

2. A linear direct current motor comprising:
   a field magnet formed by P (P being an integer of 2 or higher) contiguous magnetic poles of alternating N and S polarity;
   an armature formed by n (n being an integer of 2 or higher) armature coils arranged for movement relative to the field magnet in a moving direction, wherein each of said armature coils comprise a conductor portion to increase the amount of thrust generated by the motor;
   a moving element moving in the moving direction and provided with one of the field magnet and armature;
   a stator yoke serving as a stator and provided with the other of the field magnet and armature;
   a linear guide formed in the stator yoke and having projecting edges integrally formed on both sides of the stator yoke, each projecting edge projecting and having a triangular form in cross section; and
   guide rollers, each of which has an engaging groove in the form of a valley in its side part for slidably contacting the projecting edge of the linear guide, the guide rollers being attached to the moving element so that the guide rollers engage with the projecting edges of the linear guide thereby supporting the moving element for linear movement
   a plurality of pole discriminating sensors provided on said armature to sense a magnetic pole of said field magnet, wherein each of said plurality of pole discriminating sensors is located on said conductor portion of each of said armature coils; and
   a groove provided in said permanent magnets to accommodate said plurality of pole discriminating sensors to prevent said sensors from contacting said magnet and to reduce a field gap in said motor.

3. A linear direct current motor comprising:
   a field magnet formed by P (P being an integer of 2 or higher) contiguous magnetic poles of alternating N and S polarity;
   an armature formed by n (n being an integer of 2 or higher) armature coils arranged for movement relative to the field magnet in a moving direction;
   a moving element moving in the moving direction and provided with one of the field magnet and armature;
   a stator yoke serving as a stator and provided with the other of the field magnet and armature;
   a linear guide formed in the stator yoke and having projecting edges integrally formed on both sides of the stator yoke, each projecting edge projecting and having a triangular form in cross section; and
   guide rollers, each of which has an engaging groove in the form of a valley in its side part for slidably contacting the projecting edge of the linear guide, the guide roller being attached to the moving element so that the guide rollers engage with the projecting edges of the linear guide thereby supporting the moving element for linear movement, wherein the field magnet is coated with a magnet-failure proof and dust-generation proof film;
   a plurality of pole discriminating sensors provided on said armature to sense a magnetic pole of said field magnet; and
   a groove provided in said permanent magnets to accommodate said plurality of pole discriminating sensors to prevent said sensors from contacting said magnet and to reduce a field gap in said motor.

* * * * *